United States Patent [19]

Tamaki et al.

[11] Patent Number: 5,039,539

[45] Date of Patent: Aug. 13, 1991

[54] LOW CALORIE MEAT PRODUCTS AND A PROCESS FOR PRODUCING THE PRODUCTS

[75] Inventors: Kimie Tamaki, Tokyo; Kiyoshi Tatsumi, Iruma; Tsuguaki Nishiya, Sayama; Naoyuki Hanawa, Kawagoe; Kazuo Ido, Hino, all of Japan

[73] Assignee: Snow Brand Milk Products C., Ltd., Hokkaido, Japan

[21] Appl. No.: 476,213

[22] Filed: Feb. 7, 1990

[30] Foreign Application Priority Data

Aug. 24, 1989 [JP] Japan .................................. 1-216152

[51] Int. Cl.$^5$ .............................................. A23L 1/31
[52] U.S. Cl. .................................. 426/281; 426/573; 426/574; 426/652; 426/656
[58] Field of Search ............... 426/281, 573, 574, 652, 426/656, 513

[56] References Cited

U.S. PATENT DOCUMENTS

| 4,324,807 | 4/1982 | Kim et al. ........................ 426/574 |
| 4,381,316 | 4/1983 | Brotsky et al. ..................... 426/281 |
| 4,388,333 | 6/1983 | Maurice et al. ..................... 426/652 |
| 4,407,833 | 10/1983 | Swartz ............................... 426/281 |
| 4,455,318 | 6/1984 | Maurice et al. ..................... 426/574 |
| 4,746,522 | 5/1988 | Wofford et al. ................... 426/281 |

FOREIGN PATENT DOCUMENTS

| 31630 | 7/1981 | European Pat. Off. ........... 426/281 |
| 44358 | 1/1982 | European Pat. Off. ........... 426/574 |
| 59-173041 | 9/1984 | Japan ................................. 426/652 |
| 61-14584 | 6/1987 | Japan ................................. 426/281 |

Primary Examiner—Donald E. Czaja
Assistant Examiner—D. Workman
Attorney, Agent, or Firm—Browdy and Neimark

[57] ABSTRACT

The invention provides a low calorie meat product and a process for producing the product, which comprises dissolving protein in water, heating the protein solution at a higher temperature than that of protein denaturation, cooling the protein solution to a storage temperature of meat to obtain cold emulsion, injecting the cold emulsion into meat, and freezing the meat to obtain gelled protein.

6 Claims, No Drawings

LOW CALORIE MEAT PRODUCTS AND A PROCESS FOR PRODUCING THE PRODUCTS

BACKGROUND OF THE INVENTION

The present invention relates to low calorie meat products and processes for producing the products.

In advanced countries, in order to prevent diseases of adult people caused by excessive intake of fat and cholesterol, it is recommended that intake of fat, especially intake of animal fat should be restricted.

Concerning a low calorie meat product, paste products of minced meat such as sausages were disclosed in Japanese Laid-open Patent Application Nos. 63-254962 and 61-19467. However, a patent concerning low calorie meat products for steaks could not be found.

Concerning meat products for steaks, processes for producing marbled meat were disclosed in Japanese patent publication Nos. 60-49472 and 59-23777. However, in these processes, a liquid containing fat is injected into meat.

Since eating habits change, much meat for steaks is demanded. Common meat for steaks contains fat having high energy and cholesterol values. Then, lean meat having low energy and cholesterol values is substituted for the above meat. Those values of the lean meat are estimated low, and its texture is tough and not juicy.

SUMMARY OF THE INVENTION

Accordingly, an object of the present invention is to provide meat which is soft, juicy and tasty like marbled meat after heating though the meat has the same energy and cholesterol values as lean meat has. The meat products of the present invention as prepared by adding a protein solution to lean meat. An object of the present invention is to provide a process for producing low calorie meat products without mincing the meat for steaks.

For solving the above problems, the inventors have earnestly strived and devised a process for producing a low calorie meat product having excellent appearances, suitability for cooking and the taste, which comprises dissolving protein in water, heating the protein solution at a higher temperature than that of protein denaturation, cooling the protein solution to a storage temperature of meat to obtain a cold emulsion, injecting the cold emulsion into the meat, and freezing the meat to obtain gelled protein.

DETAILED DESCRIPTION OF THE INVENTION

In the process of the present invention, the heating temperature of the protein solution is higher than the temperature denaturing the protein. The heating time can be selected so that the protein solution has fluidity as a continuous phase of emulsion after heating the solution and gelation properties when injecting the solution into the meat and freezing the meat. For example, when a 10% solution of whey protein is heated, the heating time is preferably 20 to 60 minutes at 80° C., 20 seconds to 15 minutes at 90° C. and 2 to 5 seconds at 110° C. When the heating time is shorter than the preferable time, there is no gelation of protein after freezing the meat. As a result, after freezing and defrosting the meat, drips become cloudy and the appearance of the meat become inappropriate. When the heating time is longer than the preferable time, gelation of the protein occurs before producing the emulsion, and the fluidity of the emulsion is insufficient, so that it becomes difficult to emulsify the fat and to inject it into the meat.

As the meat in which emulsion is injected, meat such as beef, pork, horse flesh, mutton, goat meat, etc., domestic fowls such as chicken, turkey, goose, duck, etc., and hare meat can be exemplified and their low fat parts are used.

The protein used in the present invention is fluid after heating the protein solution and is gellable after freezing.

As animal and vegetable proteins, whey protein, egg whites, whole eggs, egg yolks and soy-bean protein are exemplificative. Among these proteins, whey protein and egg whites are preferably used because they are injectable into meat without affecting the taste and the viscosity is suitable for dispersing them in the meat. The frozen proteins can maintain gel without flowing from the meat.

The ratio of protein to water and the amount of protein and water are suitably determined by considering the toughness of meat and the cooking method. The protein ratio in water is preferably 0.8 to 25% by weight. For example, when whey protein is used, it is preferably 6 to 25% by weight and, when egg whites are used, it is preferably 0.8 to 15% by weight. When the protein ratio is lower than the above values, there is no gellation of protein after freezing the meat. After the meat has been frozen and defrosted, drips become cloudy and the appearances of the meat are no good. When the protein ratio is higher than the above values, the protein solution gels after heating and the fluidity of the solution is insuffcient, so that it is difficult to inject the solution into meat.

The amount of protein solution to be injected into meat is determined by the appearances, the calories required and the textures. The amount of protein solution to be injected into beef is, for example, 10–25 parts by weight based on 100 parts by weight of the meat to obtain an imitation of natural marbled meat. For lowering calories, the amount of the protein solution to be injected into meat is 50 or less parts by weight based on 100 parts by weight of the meat so as to keep the taste good.

The protein solution can be prepared by using a conventional heater.

To the protein solution obtained, if desired, seasonings, flavors and the like can be added. The solution is preferably injected at a temperature of 0°–10° C. into meat. When the temperature is higher than 10° C., micro-organisms in the meat increase. When the temperature is lower than 0° C., the solution is not dispersible in the meat because the meat freezes. For injecting the protein solution into the meat, for example, a conventional injector can be used.

The above meat products of the present invention are prepared by injecting a protein solution into meat having a little fat. Though the products have almost the same values of energy and cholesterol as lean meat has, these products are soft, juicy and tasty like marbled meat after heating.

DESCRIPTION OF PREFERRED EMBODIMENTS

The following Examples illustrate the present invention more specifically.

EXAMPLE 1

140 grammes of whey protein (protein content: 75%) was dissolved in 860 grammes of water and the solution was heated at 80° C. for 40 minutes. The protein solution was cooled to 7° C.

The viscosity of the solution obtained was 32 centipoises by using a B type viscometer at 30 rpm. The amount of solution was injected into 4 kg of round produced in Japan. After freezing, the round was sliced into a thickness of one cm and the obtained slices were defrosted at 5° C. in a refrigerator. The drips which flowed out from the defrosted slices were red and transparent. White cloudy drips were not observed.

After the product finally obtained was heated on a frying pan, the taste and the texture were estimated.

EXAMPLE 2

350 grammes of raw egg whites (protein content: 10.4%) were diluted in 650 grammes of water and heated at 80° C. for 10 minutes. The protein solution was cooled to 7° C.

The viscosity of the protein solution obtained was 52 centipoises by using a B type viscometer at 30 rpm. The amount of solution was injected into 4 kg of round produced in Japan. After freezing, the round was sliced into a thickness of one cm and the slices obtained were defrosted at 5° C. in a refrigerator. The drips which flowed out from the defrosted slices were red and transparent. White cloudy drips were not observed.

After the product finally obtained was heated on a frying pan, the taste and the texture were estimated.

The results of the taste and the texture of each Example are shown in Table 1, and the results that energy values of the meat treated in each Example and the lean meat which is not treated and the conventional meat for steaks were compared are shown in Table 2.

TABLE 1

| | Appearance before heating | Drips | Taste & texture |
|---|---|---|---|
| Not treated | Lean, fat partly dispersed | Red, transparent | Tough, not juicy, hard to bite off |
| Example 1 | Marbled | Red, transparent | Soft, juicy |
| Example 2 | Marbled | Red, transparent | Soft, juicy |

TABLE 2

| | (kcal/100 g)* |
|---|---|
| Not treated (round, no fat, Japanese beef) | 143 |
| Example 1 | 118 |
| Example 2 | 110 |
| Meat for steaks Sirloin, no fat, Japanese beef | 299 |

*The energy values of meat were quoted from "Fourth revision, Table of Japanese standard ingredients of foodstuffs". The energy values of the meat used in each Example were calculated from the above energy values of meat and the energy values of protein solutions.

We claim:

1. A process for producing low calorie meat product, which consists essentially of dissolving protein in water, heating the protein solution to a higher temperature than that of protein denaturation, cooling the protein solution to a storage temperature of meat to obtain cold emulsion, injecting the cold emulsion into meat, and freezing the meat to obtain gelled protein.

2. A process according to claim 1, wherein the protein is whey protein or egg whites.

3. A process according to claim 1, wherein the protein solution contains 0.8-25 parts by weight based on a total amount of 100 parts by weight of the solution and the process further comprises adding one or more seasonings.

4. A low calorie meat product obtained by the process according to claim 1.

5. A product according to claim 4, wherein the protein is whey protein or egg whites.

6. A product according to claim 4, wherein the protein solution contains 0.8-25 parts by weight based on a total amount of 100 parts by weight of the solution and further contains one or more seasonings.

* * * * *